(12) United States Patent
Severinsson (10) Patent No.: US 6,491,141 B1
(45) Date of Patent: Dec. 10, 2002

(54) SAFETY BRAKE ARRANGEMENT IN A BRAKE ACTUATOR

(75) Inventor: Lars Severinsson, Hishult (SE)

(73) Assignee: SAB Wabco AB, Landskrona (SE)

( * ) Notice: Subject to any disclaimer, the term of this patent is extended or adjusted under 35 U.S.C. 154(b) by 316 days.

(21) Appl. No.: 08/817,770

(22) PCT Filed: Oct. 24, 1995

(86) PCT No.: PCT/SE95/01261

§ 371 (c)(1),
(2), (4) Date: Jun. 19, 1997

(87) PCT Pub. No.: WO96/12634

PCT Pub. Date: May 2, 1996

(30) Foreign Application Priority Data

Oct. 24, 1994 (SE) .............................................. 9403625

(51) Int. Cl.[7] .............................................. B60T 13/02
(52) U.S. Cl. ....................................................... 188/170
(58) Field of Search ................................ 188/171, 166, 188/158, 162, 156, 265; 92/29

(56) References Cited

U.S. PATENT DOCUMENTS

| 3,255,676 A | * | 6/1966 | Berg et al. ...................... 92/29 |
| 4,226,168 A | * | 10/1980 | Staltmeir et al. .............. 92/130 |
| 4,230,021 A | * | 10/1980 | Aurousseau et al. ........... 92/29 |
| 4,532,462 A | * | 7/1985 | Washbourn et al. ......... 188/162 |
| 4,546,298 A | * | 10/1985 | Wickwam et al. .......... 188/162 |
| 4,777,867 A | * | 10/1988 | Severinsson et al. .......... 92/29 |
| 4,781,105 A | * | 11/1988 | Hata et al. ...................... 92/29 |
| 5,388,674 A | * | 2/1995 | Severinsson et al. ....... 188/162 |

* cited by examiner

Primary Examiner—Matthew C. Graham
(74) Attorney, Agent, or Firm—Breiner & Breiner, L.L.C.

(57) ABSTRACT

A brake actuator for delivering a brake force through a brake block or br pad to a wheel or disc to be braked comprises in a housing (1) a service brake arrangement (3, 5). The actuator also comprises a safety brake arrangement (4, 9) including at least one powerful spring (9), acting in the brake application direction, means for tensioning the spring by the reaction force at a service brake application, and mechanical means (11, 12, 13) for locking the spring to the housing in a tension state. These locking means can be released at will for accomplishing a safety brake application.

7 Claims, 7 Drawing Sheets

SAFETY BRAKE ARRANGEMENT IN A BRAKE ACTUATOR

TECHNICAL FIELD

This invention relates to a brake actuator for delivering a brake force through a brake block or brake pad to a wheel or disc to be braked, the actuator comprising in a housing a service brake arrangement.

TECHNICAL BACKGROUND

Brake actuators for service braking of vehicles, both rail vehicles and automotive vehicles, are well known. Such actuators are normally pneumatically or hydraulically operated, but also electro-mechanical actuators are known. Service braking of a vehicle may occur as block braking or disc braking, as is well known in the art.

It is in many cases desirable that the vehicle is braked if the supply of the normal brake medium, normally the pneumatic or hydraulic pressure, fails. The normal way of achieving this is by means of a so called spring brake, in which a powerful compression spring is held compressed and inactive by means of pneumatic or hydraulic pressure in a separate chamber; if this pressure drops for any reason the spring will expand and accomplish spring braking.

In certain cases, however, a normal spring brake is not the right solution. Especially if the service brake is of the electro-mechanical type, such a spring brake is not applicable at all.

THE INVENTION

A brake actuator of the kind defined above, fulfilling all requirements and specifications, is according to the invention attained in that the actuator also comprises a safety brake arrangement including at least one powerful spring, acting in the brake application direction, means for tensioning the spring by the reaction force at a service brake application, and mechanical means for locking the spring to the housing in a tensioned state, which locking means can be released at will for accomplishing a safety brake application.

It will be noted that in this solution still a powerful spring (or several powerful springs) is used for the safety brake. However, this spring is tensioned at the first service brake application after former use and is mechanically locked in this tensioned state, until it is to be used for safety braking, when for example electrical control power to the locking means is cut off.

In a first practical embodiment of the invention, in which the service brake arrangement is actuated by a pressurized brake fluidum, preferably compressed air, an inlet for the brake fluidum is arranged between a service brake piston and a safety brake piston, the safety brake spring being arranged between the safety brake piston and the actuator housing, and releasable locking means are arranged in the housing for releasably holding the safety brake piston.

In this arrangement the two brake pistons are pressed apart at a first application by the brake fluidum, and the safety brake piston is mechanically locked to the housing with the safety brake spring compressed and ready for action, whereupon normal service braking can occur without any interference with the safety brake arrangement.

In this embodiment a locking rod may be rotatably journalled to the safety brake piston and be in thread engagement with the housing, and means can be provided to releasably lock the locking rod to the housing.

Preferably the locking means include an electro-magnet attached in the housing and a locking washer, which is connected to the locking rod and is arranged in the vicinity of the electro-magnet for locking thereby.

In a specific variation hereof a locking spring is arranged between the locking washer and the locking rod for obtaining a locking servo action.

In another version of the locking means a connecting spring ring is arranged in corresponding grooves in a tubular piston rod of the safety brake piston and a sleeve or extension in the housing, and control means are provided on the housing for changing the diameter of the spring ring between positions for engagement and disengagement between the piston rod and the housing extension.

In a second practical embodiment of the invention, in which the service brake arrangement still is actuated by a pressurized brake fluidum, the safety brake spring is arranged between the housing and a safety brake piston, which is placed in front of the service brake piston as counted in the brake application direction and is provided with attachments extending out through slits in the housing, and releasable locking means are provided between the housing and a tubular safety brake piston, which encloses a push rod for the service brake.

This embodiment is rather close to the previous embodiment in certain respects. However, the safety brake arrangement is arranged in front of the service brake arrangement, and attachments on the safety brake piston serve as mountings for the actuator in the vehicle.

The locking means in this embodiment preferably consist of a connecting spring ring, which is arranged in corresponding grooves in a sleeve-shaped housing extension and the safety brake piston rod, and the control means are provided on the housing for changing the diameter of the spring ring between positions for engagement and disengagement between the extension and the piston rod.

The control means hereby include an electro-magnet, a pneumatic or hydraulic actuator or the like.

In a third embodiment of the invention, in which the service brake arrangement is actuated by a pressurized brake fluidum, preferably hydraulic fluid acting on a service brake piston, at least one safety brake spring is arranged—in a disc brake caliper, generally comprising a caliper frame and a caliper housing—between a caliper frame flange and a caliper housing flange, and a locking rod is rotatably journalled in the caliper frame and is in thread engagement with the caliper housing, means being provided to releasably lock the locking rod to the caliper housing.

The locking means here preferably include an electro-magnet attached in the caliper housing and a locking washer, which is connected to the locking rod and is arranged in the vicinity of the electro-magnet for locking thereby.

In a fourth practical embodiment, in which the service brake arrangement is actuated by an electric motor via means for transforming its rotary movement into an axial movement of a service brake push rod, i.e. an electro-mechanical service brake, the safety brake spring is arranged between the housing and a safety brake piston, which is provided with attachments extending out through slits in the housing, and releasably locking means are provided between the housing and a tubular safety brake piston rod, which encloses the service brake push rod.

Here, a connecting spring ring is arranged between a sleeve shaped housing extension and the safety brake piston rod, and control means are provided on the housing for changing the diameter of the spring ring between positions for engagement and disengagement between the housing extension and the piston rod.

Also in a fifth embodiment the service brake arrangement is actuated by an electric motor via means for transforming its rotary movement into an axial movement of a service brake push rod or force transmitting member. Accordingly, this arrangement is an electro-mechanical service brake, and in fact this is a practical and preferred embodiment.

Here, in a disc brake caliper, generally comprising a caliper frame and a caliper housing, at least one safety brake spring is arranged between a caliper frame flange and a caliper housing flange; a locking rod is further rotatably journalled in the caliper frame and is in thread engagement with the caliper housing, and means are provided to releasably lock the locking rod to the caliper housing.

These locking means may preferably include an electro-magnet attached in the caliper housing and a locking washer, which is connected to the locking rod and is arranged in the vicinity of the electro-magnet for locking thereby.

In one modification hereof a locking spring is arranged between the locking washer and the locking rod for obtaining a locking servo action. This locking spring may constitute a slitted end portion of the locking rod.

BRIEF DESCRIPTION OF THE DRAWINGS

The invention will be described in further detail below reference being made to the accompanying drawings, in which.

DETAILED DESCRIPTION OF EMBODIMENTS

Figure 1:
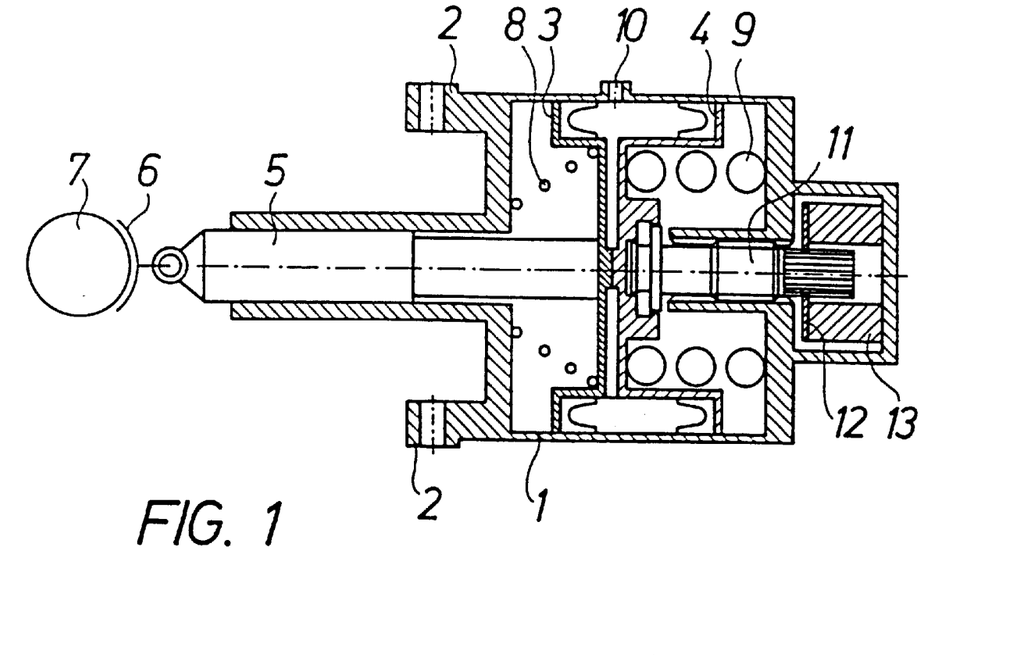
FIG. 1 is a schematic section through a first embodiment of a block brake actuator according to the invention.

In a simple version a block brake actuator according to the invention may be of the design shown in FIG. 1.

In a common cylinder 1, which is provided with attachments 2 for its mounting for example to the under-frame of a vehicle, two sealed pistons 3 and 4 are axially movable. The first piston 3 is a service piston connected to a push rod 5, preferably comprising a mechanical slack adjuster of any type, and further to a brake block 6 for braking engagement with a wheel 7 to be braked. A return spring 8 for the service piston 3 is arranged in the cylinder 1.

The second piston 4 is a spring brake or safety brake piston, which is acted on in the brake application direction by a powerful safety brake spring 9 of compression type. An inlet 10 for pressurized air is arranged on the cylinder 1 between the two pistons 3 and 4, which accordingly are pressed apart at the admission of air under such pressure that the force of the safety brake spring 9 is overcome.

Means are provided for releasably locking the safety brake piston 4 with the safety brake spring 9 compressed. In the shown case these means include a locking rod 11 rotatably attached to the safety brake piston 4 and in thread engagement with a thread in the cylinder 1. A washer 12 provided with teeth at its inner circumference is axially movable on splines at the end of the locking rod 10 remote from the piston 4. A powerful electro-magnet 13 is attached to the cylinder 1 in the vicinity of the washer 12.

When energized as shown, the electro-magnet 13 will attract the washer 12 and keep the locking rod 11 from rotating, so that the safety brake piston 4 is held in an inactive position with the safety brake spring 9 compressed.

If the electro-magnet 13 is deenergized on the other hand, the washer 12 and thus the locking rod 11 is allowed to rotate, so that the safety piston 4 moves to the left in the drawing under the action of the safety brake spring 9 and applies the brake via the service piston 3 and the push rod 5.

When the safety brake piston 4 is held inactive, the brake actuator functions as a normal service brake actuator at the admission of pressurized air through the inlet 10 to the cylinder 1.

Figure 2:
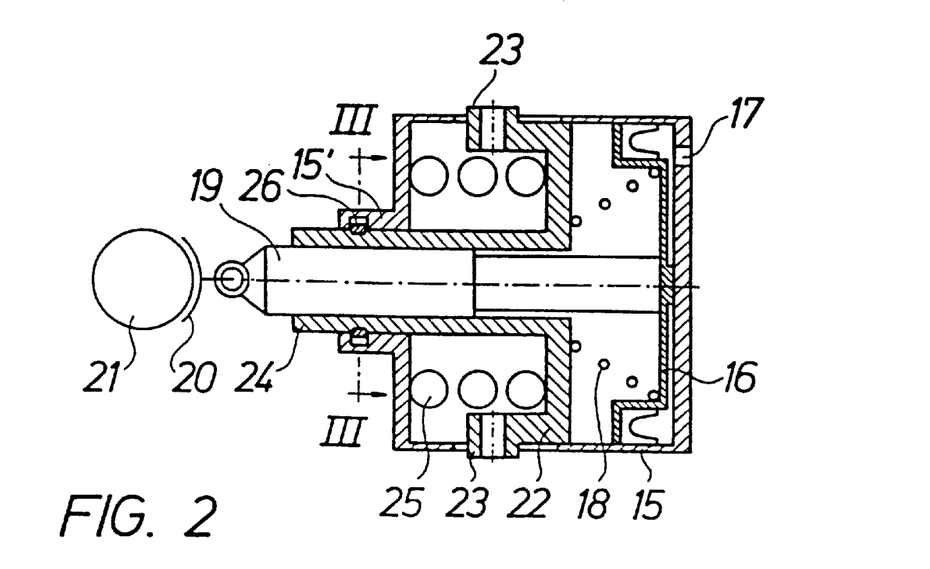
FIG. 2 is a corresponding section through a second embodiment.
Figure 3A:
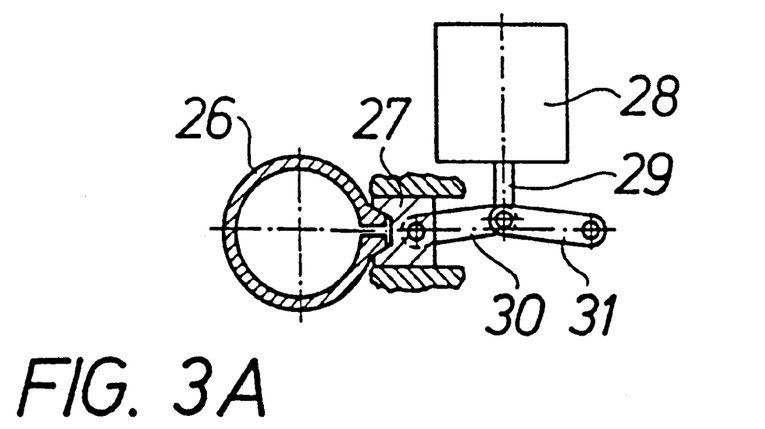
FIGS. 3A–C are cross sections along the line III—III in FIG. 2 of different design alternatives.
Figure 3B:
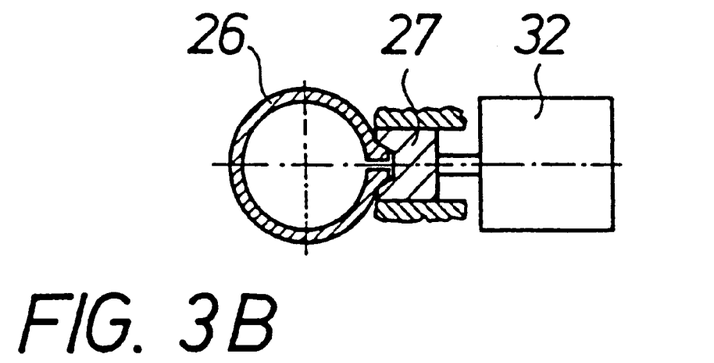
Figure 3C:
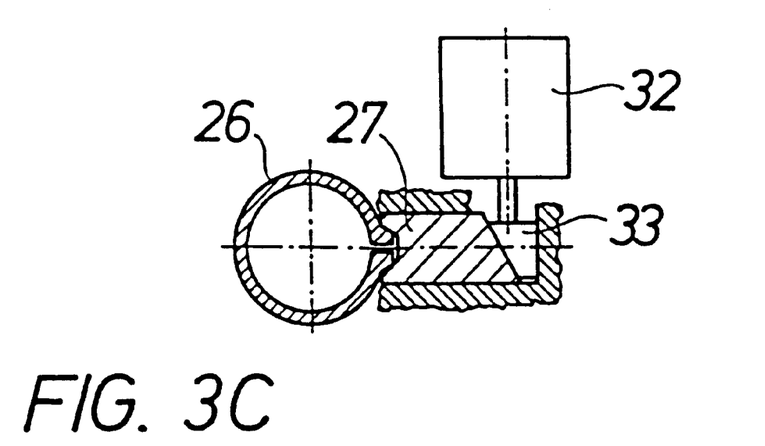

A variation of the block brake actuator shown in FIG. 1 is shown in FIGS. 2 and 3.

In a cylinder 15 a service piston 16 is axially movable in a brake application direction to the left in the drawing under the action of pressurized air admitted through an inlet 17 therefore. In the opposite direction the piston 16 is movable under the action of a return spring 18. The service piston 16 is connected to a push rod 19, preferably containing a suitable slack adjuster, and further to a brake block 20 for brakingly engaging a vehicle wheel 21.

A safety brake piston 22 is also axially movable in the cylinder 15, but in this case in front of the service piston 16. This safety brake piston 22 is provided with attachments 23 for mounting of the brake actuator for example to the underframe of the vehicle; these attachments extend out through axial slits in the cylinder 15. A tubular safety brake piston rod 24 connected to the safety brake piston 22 extends forward or to the left in the drawing around the push rod 19. A powerful safety brake spring 25 of compression type is arranged between the cylinder 15 and the safety brake piston 22.

Means are provided for releasably locking the safety brake piston 22 with the safety brake spring 25 compressed, as shown in FIG. 2. In this case these means include a spring ring 26, shown both in FIG. 2 and in FIGS. 3A–C. This spring ring 26 is of the type with a bias towards an expanded position and may be held in a compressed position shown in FIGS. 2 and 3A–C by for example any of the arrangements shown in FIGS. 3A–C.

The free ends of the spring ring 26 are slanted and cooperate with corresponding inner slanted surfaces in an operating block 27, which in the alternative shown in FIG. 3A is axially movable by an arrangement including an electro-magnet 28, a push rod 29, and two levers 30 and 31 forming a toggle joint.

In the position shown in FIG. 3A, the electro-magnet 28 is energized, pushing the push rod 29 downwards and—through the cooperation with the toggle joint 30, 31—the operating block 27 to the left in the drawing, so that the spring ring 26 is held compressed. Hereby the spring ring 26 will rest in a circumferential, external groove in the safety brake piston rod 24 but partly in a deeper, circumferential, internal groove in a tubular extension 15' of the cylinder 15. In this position the spring ring 26 locks the safety brake piston rod 24 and accordingly the safety brake piston 22 to the cylinder 15. Hereby the brake actuator can work as a normal service brake actuator under the action of pressurized air on the service piston 16.

When a safety braking is to be performed, for example if no pressurized air is available, the electro-magnet 28 is deenergized, so that the operating block 27 is free to move to the right in the drawing under the force from the spring ring 26, which accordingly expands entirely into the groove in the cylinder extension 15' leaving the safety brake piston rod 24 and the safety brake piston 22 freedom to move in relation to the cylinder 15. As the actuator is mounted (to the vehicle underframe) by means of the attachments 23 on the safety brake piston 22, the force from the spring 25 acts on the cylinder 15 and accordingly on the service piston 16 to the left in the drawing or in the brake application direction.

Two alternative designs for actuating the operating block 27 are shown in FIGS. 3B and C. In FIG. 3B the block 27 is directly connected to an electro-magnet or a pneumatic or hydraulic actuator 32. In FIG. 3C the end of the operating block 27 is wedge-shaped and cooperates with a wedge 33 connected to an electro-magnet or a pneumatic or hydraulic actuator 32.

When the safety brake has been used and the arrangement is to be returned to the position shown in FIG. 2 ready for new action, pressurized air is admitted through the inlet 17, moving the cylinder 15 to the right in the drawing (against the force of the safety brake spring 25). When the grooves in the safety brake piston rod 24 and the cylinder extension 15' are opposite each other, the electro-magnet 28 or the actuator 32 can be energized, so that the spring ring 26 is locked in the shown position.

Figure 4:
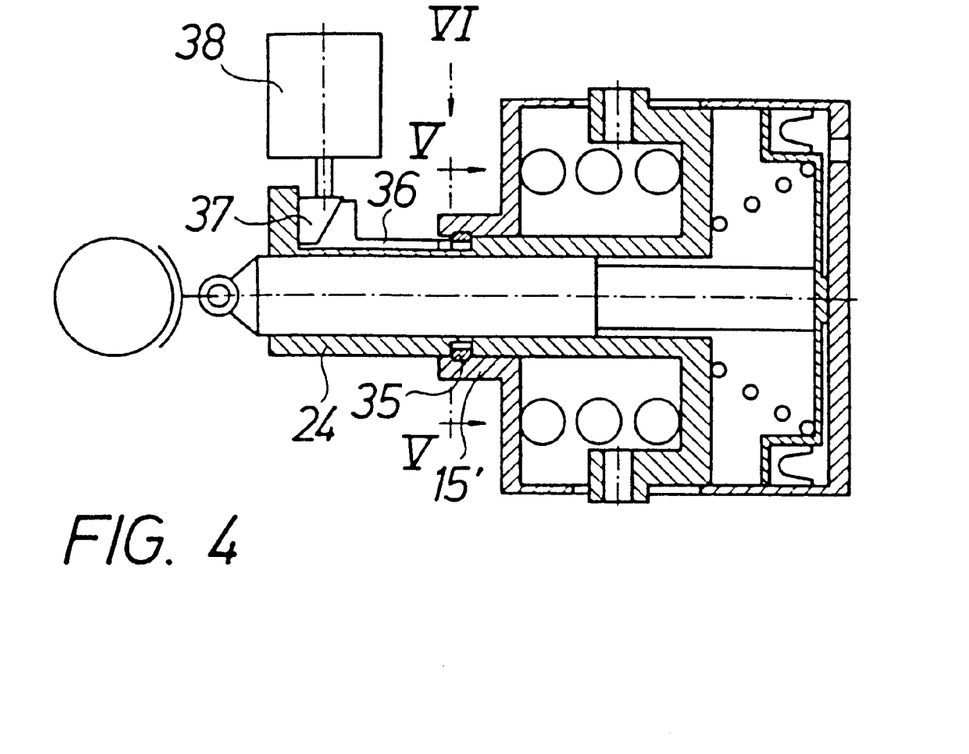
FIG. 4 is a section through a modification of the embodiment of FIG. 2.

FIG. 4 illustrates a variation of the embodiment of FIG. 2, and only parts which differ from those in FIG. 2 are shown and described.

Figure 5:
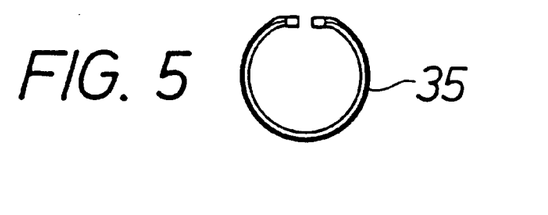
FIG. 5 is a cross section along the line V—V in FIG. 4.
Figure 6:
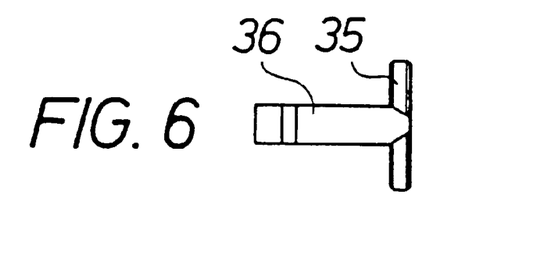
FIG. 6 is a view in the direction of the arrow VI in FIG. 4.

In this case the spring ring, which connects the tubular cylinder extension 15' and the tubular brake piston rod 24 and which here has received the numeral 35, is of the type with a bias towards the compressed position and may be held in an expanded position shown in FIGS. 4–6 by an arrangement to be described.

The free ends of the spring ring 35 are chamfered and cooperate with corresponding chamfered surfaces or a wedge of an operating member 36, which is axially movably arranged in the brake piston rod 24. The end of this operating member 36 is wedge-shaped and cooperates with a wedge 37 actuated by an electro-magnet or a pneumatic or hydraulic actuator 38 in the same way as has been described with reference to FIGS. 2 and 3A–C.

Figure 7:
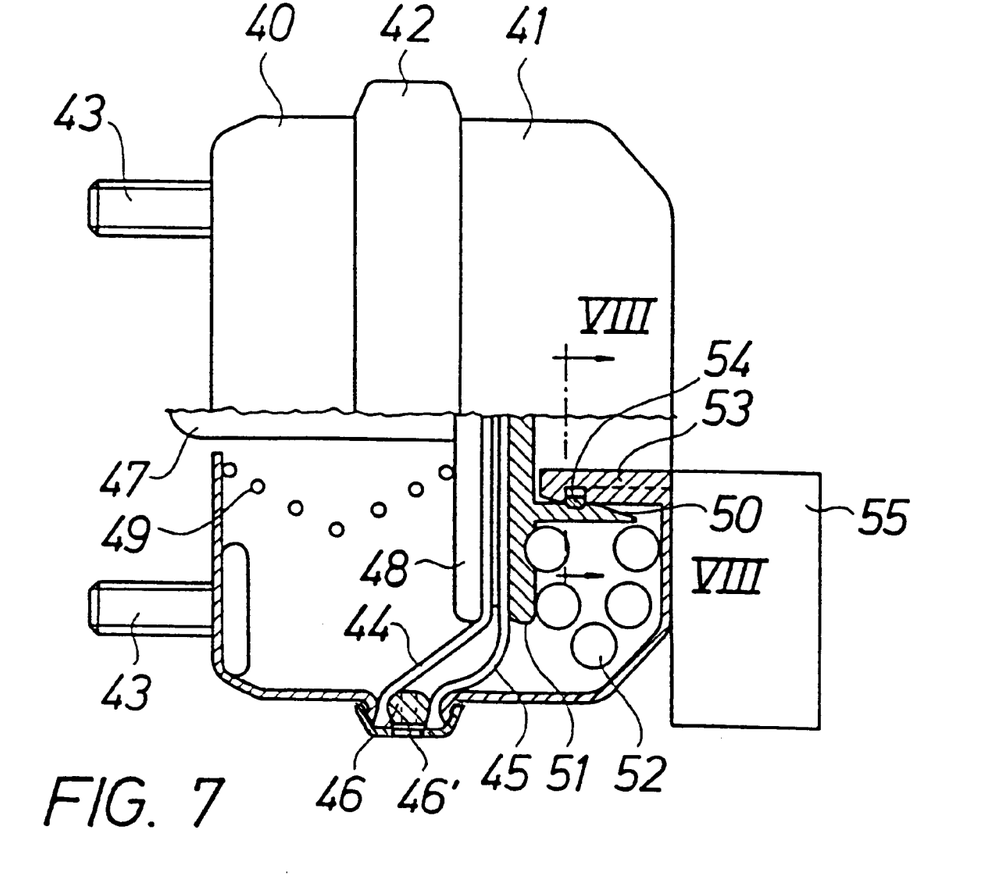
FIG. 7 is a partly sectional side view of a third embodiment of the invention.
Figure 8:
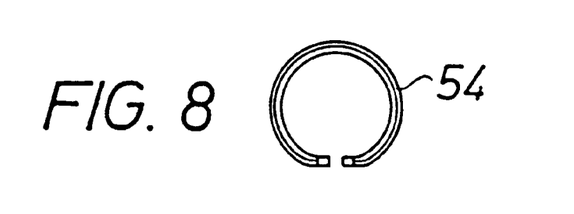
FIG. 8 is a cross section along the line VIII—VIII in FIG. 7.

The embodiment shown in FIGS. 7 and 8 has similarities with the embodiment according to FIG. 1 but is more specifically intended for automotive use. Especially, the pistons thereof are of the diaphragm type.

Two deep-drawn cylinder halves 40 and 41 held together by a band 42 form a brake cylinder, as is well known in the art. The first cylinder half 40 is provided with screws 43 for the mounting of the brake cylinder to a suitable part of a vehicle underframe.

A service brake piston 44 and a safety brake piston 45, both of the diaphragm type, are clamped between the two cylinder halves 40 and 41 together with an intermediary ring 46, which also provides access for pressurized air through an inlet 46' therefore, by means of the band 42.

The service brake piston 44 has a piston rod 47 with a disc 48 engaging the diaphragm piston 44. This piston rod 47 may be provided with a suitable slack adjuster, but in most cases the slack adjusting function is performed elsewhere in the brake arrangement. A return spring 49 of the compression type is arranged between the cylinder half 40 and the disc 48.

The safety brake piston 45 has a tubular piston rod 50 and a disc 51 engaging the diaphragm piston 45. A powerful safety brake spring 52 of compression type is arranged around the piston rod 50, between the second cylinder half 41 and the disc 51.

The second cylinder half 41 is provided with an extension or sleeve 53 extending into the tubular piston rod 50. Means are provided for releasably locking the safety brake piston 45, i e the tubular piston rod 50, to the second cylinder half 41, i e the extension 53, with the spring 52 compressed. In this case these means include a spring ring 54, which is of the type with a bias towards a compressed position and may be held in an expanded position by means not shown in detail in FIG. 7 but for example corresponding to those shown in FIGS. 4 and 6 and described above. Only an actuator 55 for this purpose is shown in FIG. 7.

The function of the embodiment shown in FIG. 7 should be clear from the description of the previous embodiments.

Figure 9:
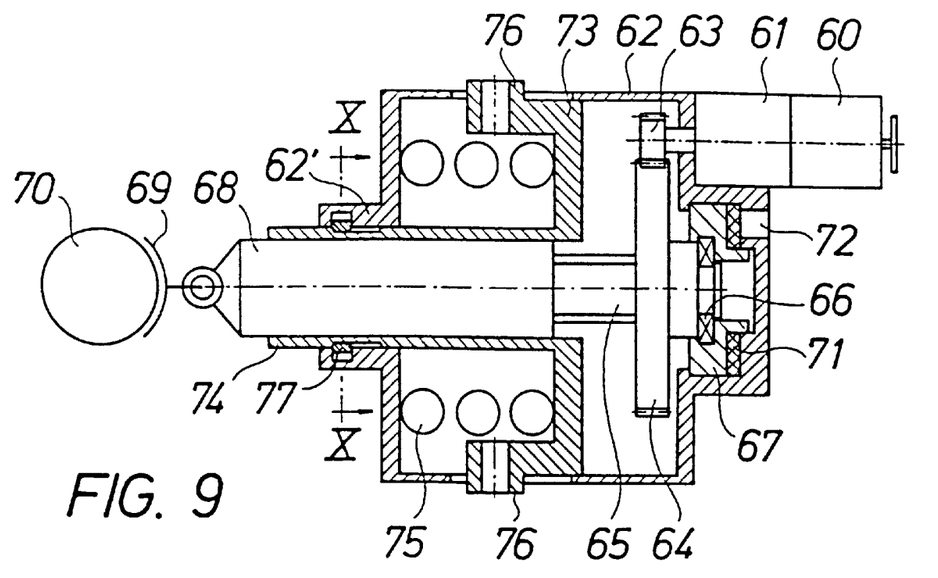
FIG. 9 is a section corresponding to FIG. 1 through a fourth embodiment.
Figure 10:
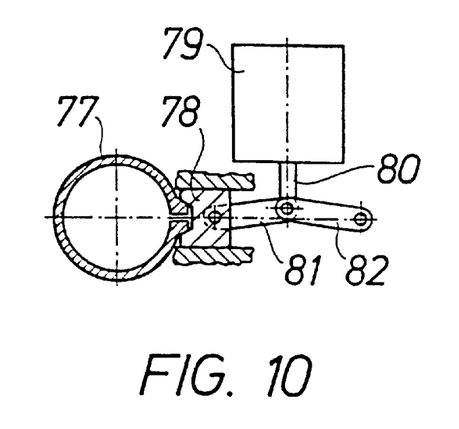
FIG. 10 is a cross section along the line X—X in FIG. 9.

FIGS. 9 and 10 show a safety brake arrangement according to the invention applied to an electro-mechanical block brake actuator. This electro-mechanical service brake is already known and will not be dealt with in detail, although it is comparatively complicated.

In this case the service brake force is generated by an electric motor 60, which is mounted on a cylinder 62 together with a brake control clutch unit 61. A rotary shaft from the unit 61 is provided with a small gear wheel 63 engaging a larger gear wheel 64 on a spindle 65. This spindle 65 is journalled in the cylinder 62 by means of a bearing 66 and an intermediary member 67 (to be described).

The rotary motion in a brake applying direction of the spindle 65 is transformed into an axial movement to the left in the drawing of a push rod 68 connected to a brake block 69 for braking engagement with a wheel 70. The mechanism for accomplishing the transformation from rotary to axial movement is not shown but may for example be a conventional ball screw.

When the brake force has attained a certain value, a reaction force is sensed in an elastic ring 71 arranged between the cylinder 62 and the intermediary member 67. This force is sensed by a force transducer 72, which may emit a signal for terminating the rotation of the electric motor 60 and thus the service brake application.

The actuator according to FIG. 9 is provided with a safety brake arrangement of the same general kind as the actuator according to FIG. 2. A safety brake piston 73 is axially movable in the cylinder 62. It is provided with a tubular safety brake piston rod 74 extending forward around the push rod 68 and guided in a cylinder extension 62'. A powerful safety brake spring 75 is arranged between the cylinder 62 and the safety brake piston 73. The safety brake piston 73 is provided with attachments 76 for mounting of the brake actuator for example to the underframe of the vehicle; these attachments extend out through axial slits in the cylinder 62.

Means are provided for releasably locking the safety brake piston 73 with the safety brake spring 75 compressed, as shown in FIG. 9. In the same way as with the arrangement shown in FIGS. 2 and 3A and described with reference thereto, these means include an expanding spring ring 77, cooperating over slanted surfaces with an operating block 78. The arrangement also includes an electro-magnet 79, a push rod 80, and two levers 81 and 82 forming a toggle joint.

The operation of the embodiment according to FIGS. 9 and 10 corresponds so closely to that of the embodiment according to FIGS. 2 and 3A that reference is made to the description above thereof.

It is to be noted that variations as shown in FIGS. 3B and C and in FIG. 4 may also be used for the embodiment according to FIG. 9.

Figure 11:
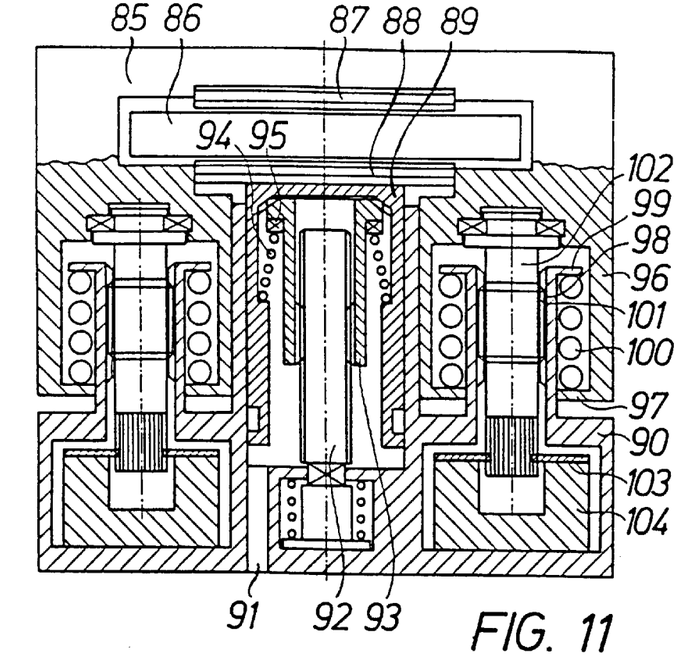
FIG. 11 is a shematic section through a first embodiment of a disc brake actuator according to the invention.

In FIG. 11 a hydraulic disc brake actuator with a safety brake arrangement according to the invention is shown.

A caliper frame 85 is arranged around a rotating disc 86 to be braked. A first brake pad 87 is mounted in the frame 85, whereas a second brake pad 88 is mounted at the end of a hydraulic service brake piston 89.

The hydraulic brake piston 89 is axially movable substantially perpendicular to the brake disc 86 in an axial bore in a caliper housing 90. The caliper frame 85 and the caliper housing 90 are connected to each other by means of safety brake arrangements to be described. At service braking they may be regarded as a unit, whereas they are axially movable in relation to each other at safety braking.

Hydraulic fluid under pressure is admitted to the piston 89 through an inlet 91 at service braking.

The hydraulic service piston 89 is provided with a slack adjuster arrangement, which does not form any part of the invention and will only be briefly described without reference to its function. A non-rotatable spindle 92 is elastically mounted to the caliper housing 90. A tubular adjuster nut 93 is in non-self-locking thread engagement with the spindle 92. The end of the adjuster nut 93 is in releasable clutch engagement with the hydraulic piston 89. The adjuster nut 93 is urged into this engagement by means of a compression spring 94 between a piston shoulder and an adjuster nut bearing 95.

As already stated, a safety brake arrangement now to be described connects the caliper frame 85 and the caliper housing 90. In the shown case the arrangement contains two identical devices, and for the sake of simplicity only one such device—the one to the right in FIG. 11—is provided with reference numerals.

The caliper frame 85 forms a sleeve 96 with an inwardly directed flange 97, whereas the caliper housing 90 has a tube 98, which extends into the sleeve 96 and has an outwardly directed flange 99. A powerful safety brake spring 100 of compression type is arranged between the flanges 97 and 99, the arrangement thus being such that the spring bias tends to push the two members (caliper and housing) together and applying brake force from the brake pads 87 and 88 on the brake disc The tube 98 is provided with internal threads for cooperation with external threads 101 on a locking rod 102, which is rotatably arranged in the the caliper frame 85.

Towards its lower end in the drawing the locking rod 102 is splined, and a washer 103 with internal teeth is axially movable on this splined end of the locking rod 102. A powerful electro-magnet 104 is arranged in the caliper housing 90 close to the washer 103. When energized the electro-magnet 104 attracts the washer 103 and accordingly locks the locking rod 102 against rotation, so that the spring 100 is held in its shown, compressed condition ready for safety braking, if and when the electro-magnet 104 is deenergized.

Figure 12:
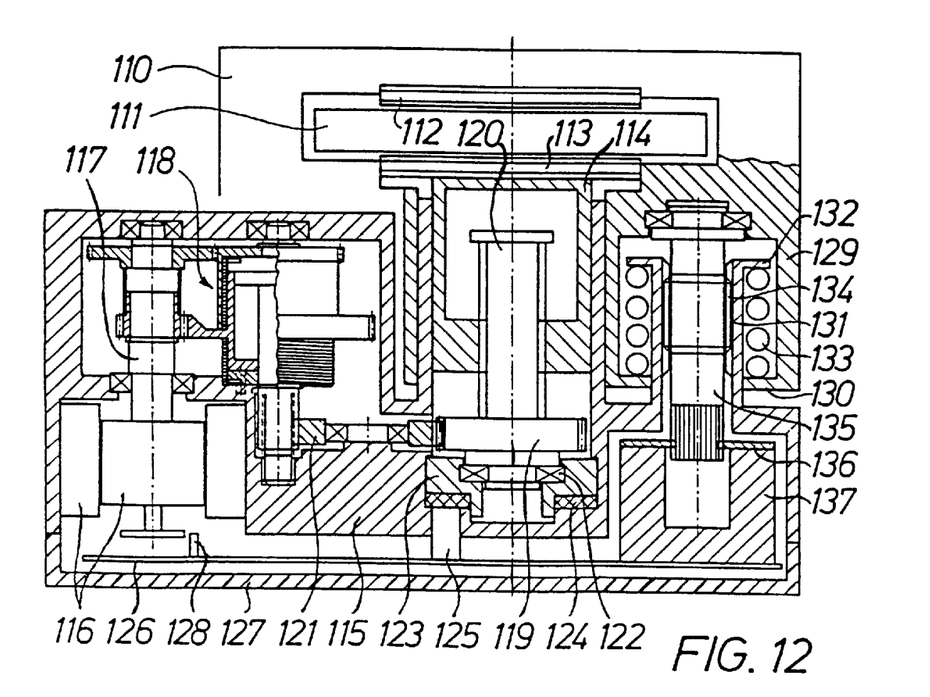
FIG. 12 is a section corresponding to FIG. 11 of a second and preferred embodiment of a disc brake actuator.

Also FIG. 12 shows a disc brake actuator, which—like the actuator shown in FIG. 9—contains a service brake of an electro-mechanical type. However, the general construction of the actuator has similarities with that of the disc brake actuator of FIG. 11.

A caliper frame 110 is arranged around a rotating disc 111 to be braked. A first brake pad 112 is mounted in the frame 110, whereas a second brake pad 113 is mounted at the end of a force transmitting member 114.

This force transmitting member 114 is axially movable perpendicular to the brake disc 111 in an axial bore in a caliper housing 115. The caliper frame 110 and the caliper housing 115 are connected to each other by means of safety brake arrangements to be described. At service braking they may be regarded as a unit, whereas they are axially movable in relation to each other at safety braking.

The electro-mechanical service brake arrangement, which will now be briefly described and which does not per se form any part of the invention, is placed entirely in the caliper housing 115. The arrangement has already been shown and disclosed in EP-B-0 334 435, and for further explanations reference is made to this publication, especially the embodiment according to FIG. 3 therein.

The power source for the service brake is an electric motor 116, the shaft 117 of which being journalled for rotation in the housing 115. From this shaft 117 the rotation is transmitted via gearings to a brake control clutch unit 118, which also is journalled for rotation in the housing 115 in parallel with the motor shaft 117.

The rotation of the brake control clutch unit 118 is ultimately transmitted to a gear wheel 119 on a spindle 120 via an intermediate gear wheel 121 rotatably journalled in the housing 115. This spindle 120 is journalled in the housing 115 by means of a bearing 122 and an intermediary member 123 (to be described).

The rotatable spindle 120 is in thread engagement with the force transmitting member 114, which is guided for axial movements only in its bore in the housing 115. This means that rotational movements of the spindle 120 will be transformed into axial movements of the force transmitting member 114, so that the brake pad 113 will be brought into braking engagement with the rotating brake disc 111.

Other means of transforming the rotating movement into an axial movement are feasible.

When the brake force has attained a certain value, a reaction force is sensed in a elastic ring 124 arranged between the housing 115 and the intermediary member 123. This force is sensed by a force transducer 125, which may emit a signal for terminating the rotation of the electric motor 116 and thus the service brake application.

The force transducer 125 may be mounted on a control card 101 arranged under a cover 127 on the housing 115. Also mounted on the control card is a position detector 128 for the motor shaft 117. The control card 126 may contain all electronic equipment for control of the brake actuator.

As already stated, a safety brake arrangement now to be described connects the caliper frame 110 and the caliper housing 115. This arrangement contains in this case two identical devices, but only one such device is visible in the section chosen in FIG. 12, where the service brake arrangement is placed "above" the second safety brake device. It should be noted that the number of safety brake devices can vary depending on the circumstances.

The caliper frame 110 forms a sleeve 129 with an inwardly directed flange 130, whereas the caliper housing 115 has a tube 131, which extends into the sleeve 129 and has an outwardly directed flange 132. A powerful safety brake spring 133 of compression type is arranged between the flanges 130 and 132, the arrangement thus being such that the spring bias tends to push the two members (caliper and housing) together and applying brake force from the brake pads 112 and 113 on the brake disc 111.

The tube 131 is provided with internal threads for cooperation with external threads 134 on a locking rod 135, which is rotatably arranged in the caliper frame 110.

Towards its lower end in the drawing the locking rod 135 is splined, and a washer 136 with internal teeth is axially movable on this splined end of the locking rod 135. A powerful electro-magnet 137 is arranged in the caliper housing 115 close to the washer 136. When energized the electro-magnet 137 attracts the washer 103 and accordingly locks the locking rod 135 against rotation, so that the spring 133 is held in its shown, compressed condition ready for safety braking, if and when the electro-magnet 137 is deenergized.

Figure 13:
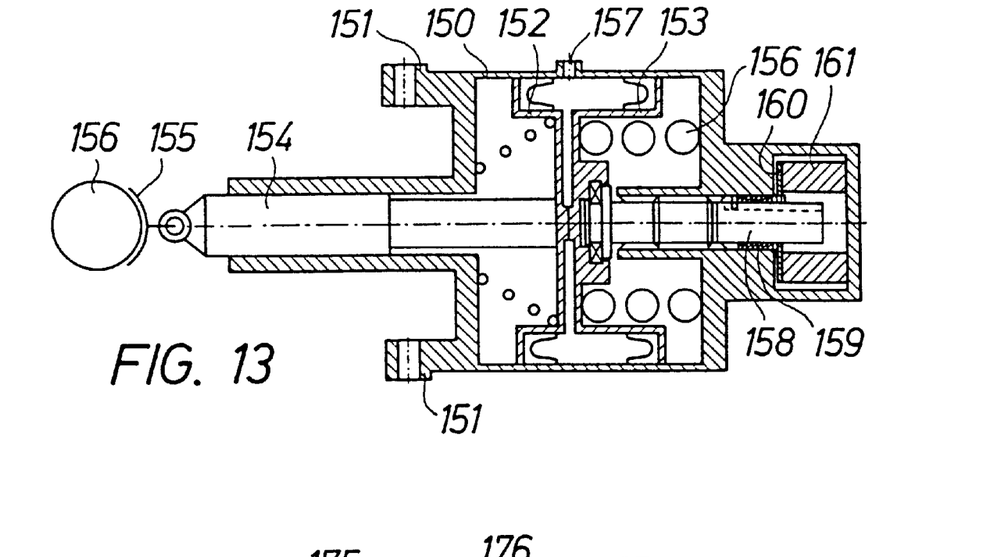
FIG. 13 is a schematic section through a fourth embodiment of a block brake actuator according to the invention.

The fourth embodiment of a block brake actuator according to the invention as shown in FIG. 13 has obvious similarities with the first embodiment shown in FIG. 1.

A cylinder 150 is provided with attachments 151. A service piston 152 and a spring brake or safety brake piston 153 are axially movable therein.

The service piston 152 is connected to a push rod 154, preferably comprising a mechanical slack adjuster of any type, and further to a brake block 155 for braking engagement with a wheel 156 to be braked.

The safety brake piston 153 is acted on in the brake application direction by a powerful safety brake spring 156 of compression type. An inlet 157 for pressurized air is arranged on the cylinder 150 between the two pistons 152 and 153.

Means are provided for releasably locking the safety brake piston 153 with the safety brake spring 156 compressed, when compressed air has been admitted through the inlet 157. A locking rod 158 is rotatably attached to the safety brake piston 153 and in thread engagement with a thread in the cylinder 150. A locking spring 159 is arranged around the locking rod 158, and its end to the left in the drawing is connected to the rod 158 (having an axial groove for this purpose). Its other end is in a similar manner connected to a washer 160 in the vicinity of a powerful electro-magnet 161, fixed in the cylinder 150.

The nominal inner diameter of the locking spring 159 corresponds to the outer diameter of the locking rod 158, so that when the electro-magnet 161 is deenergized and the washer 160 is left free, the locking rod 158, the locking spring 159 and the washer 160 are free to rotate as a unit.

When on the other hand the electro-magnet 161 is energized and locks the washer 160 to it, a minor further rotation of the locking rod 158 (under the action of the safety brake spring 156) in the opening direction of the locking spring 159 will effect a locking against the inner periphery of the cylinder bore in which the locking rod 158 is arranged. The locking will be effected with a servo action.

Figure 14:
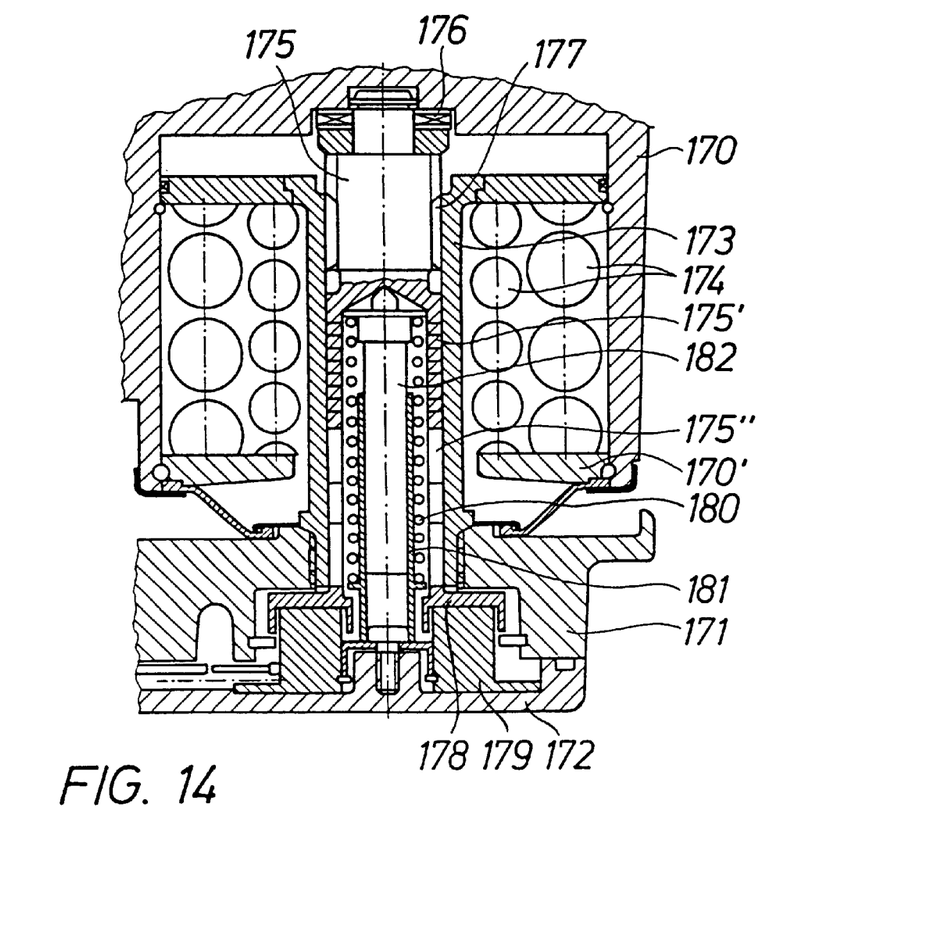
FIG. 14 is a section through a portion of the second embodiment according to FIG. 12 in a slightly modified version in line with FIG. 13.

FIG. 14 is a section through a practical and modified version of the embodiment according to FIG. 12, the portion shown being the one to the right in FIG. 12.

The general design and function of this embodiment will not be repeated for the FIG. 14 version, reference instead being made to the description of FIG. 12.

The caliper frame sleeve has received the reference numeral 170 in FIG. 14, the caliper housing 171, the housing cover 172 and the caliper housing tube 173. Safety brake springs 174 are arranged between a sleeve ring 170' and the end of the tube 173.

A locking rod 175 is journalled in the caliper frame by means of an axial bearing 176. By means of external threads 177 the locking rod 175 is in thread engagement with internal threads in the tube 173. A sleeve-shaped end of the locking rod 175 extending downwards in the drawing into the tube 173 is circumferentially slitted to form a locking spring 175' with an outer diameter slightly smaller than the inner diameter of the tube 173.

The lower end of the locking spring 175' is extended into two fingers 175", which are in engagement with corresponding notches or the like in the upper end of a locking sleeve 178.

The lower end of the locking sleeve 178 in the form of a washer bears on an electro-magnet 179, attached to the housing cover 172. When energized, the electro-magnet 179 will hold the locking sleeve 178 against rotation.

The locking rod 175 is under a certain bias upwards in the drawing by means of a compression spring 180 arranged inside the locking spring 175' and the locking sleeve 178. This spring 180 is arranged between a flange on a spring sleeve 181, bearing against the housing cover 172, and a flange on a spring guide rod 182, which is axially movable within the spring sleeve 181. The rod 182 has a pointed end in engagement with a corresponding cup in the locking rod 175 for allowing free mutal rotational movements. The purpose of the spring bias on the locking rod 175 is to ensure a proper position of the locking rod relative to the caliper frame.

When the electro-magnet 179 is deenergized, the locking sleeve 178 and the locking rod 175 with its locking spring 175' will be free to rotate (under the action of the expanding safety brake springs 174). When on the other hand the electro-magnet 179 is energized, the locking spring 175' will be expanded into firm and locking engagement with the tube 173 by a small rotation under the action of the safety brake springs 174. A locking servo action is accordingly obtained by the use of the locking design with the locking spring 175'.

It will be understood that modifications of different kinds are possible to all embodiments. Especially, pneumatic actuation can be replaced by hydraulic actuation, and vice versa. When reference has been made to block braking, it can in most cases be replaced by disc braking, and vice versa. Only slight modifications are necessary to replace a spring ring with a bias to expand with one with a bias to compress, as will be readily understood by anyone skilled in the art.

What is claimed is:

1. A brake actuator for delivering a brake force through a braking element to a vehicle being braked, comprising in combination: a housing, a service brake arrangement within said housing, an associated safety brake arrangement mounted within the housing operable from at least one powerful safety brake spring for actuating the safety brake arrangement, a means for compressing the safety brake spring during a service brake application, a mechanical locking means for locking the safety brake spring to the housing in a non-braking compressed state, a safety brake spring unlocking means for releasing at will the mechanical locking means from the compressed state to reside in a decompressed state thereby accomplishing a safety brake application in response to decompression of said safety brake spring, and electric motor driven means for actuating the unlocking means thereby to apply the service brake.

2. A brake actuator according to claim 1, wherein the safety brake spring is arranged between the housing and a safety brake piston, said safety brake piston being provided with attachments extending out through openings in the housing, and further comprising releaseable locking means arranged between the housing and a tubular safety brake piston rod which encloses a service brake push rod.

3. A brake actuator according to claim 2, further comprising a connecting spring ring arranged between a sleeve-shaped extension in the housing and the safety brake piston rod, and control means arranged on the housing for changing diameter of the spring ring between positions for engagement and disengagement between the sleeve-shaped extension and the piston rod.

4. A brake actuator according to claim 1, further comprising a disc brake caliper comprising a caliper frame and a caliper housing; at least one of said safety brake spring arranged between a flange in the caliper frame and a flange in the caliper housing; a locking rod rotatably journalled in the caliper frame and in threaded engagement with the caliper housing; and means to releaseably lock the locking rod to the caliper housing.

5. A brake actuator according to claim 4, wherein the locking means include an electro-magnet attached in the caliper housing and a locking washer which is connected to the locking rod and arranged in a vicinity of the electro-magnet for locking thereby.

6. A brake actuator according to claim 5, further comprising a locking spring arranged between the locking washer and the locking rod for obtaining a locking servo action.

7. A brake actuator according to claim 6, wherein the locking spring comprises a slitted end portion of the locking rod.

* * * * *

UNITED STATES PATENT AND TRADEMARK OFFICE
CERTIFICATE OF CORRECTION

PATENT NO.    : 6,491,141 B1
DATED         : December 10, 2002
INVENTOR(S)   : Lars Severinsson It is certified that error appears in the above-identified patent and that said Letters Patent is hereby corrected as shown below:

<u>Title page,</u>
Item [57], ABSTRACT,
Line 2, "br pad" should read -- brake pad --.

Signed and Sealed this

Fourth Day of March, 2003

Attest:

Attesting Officer

JAMES E. ROGAN
Director of the United States Patent and Trademark Office